Figure 1:
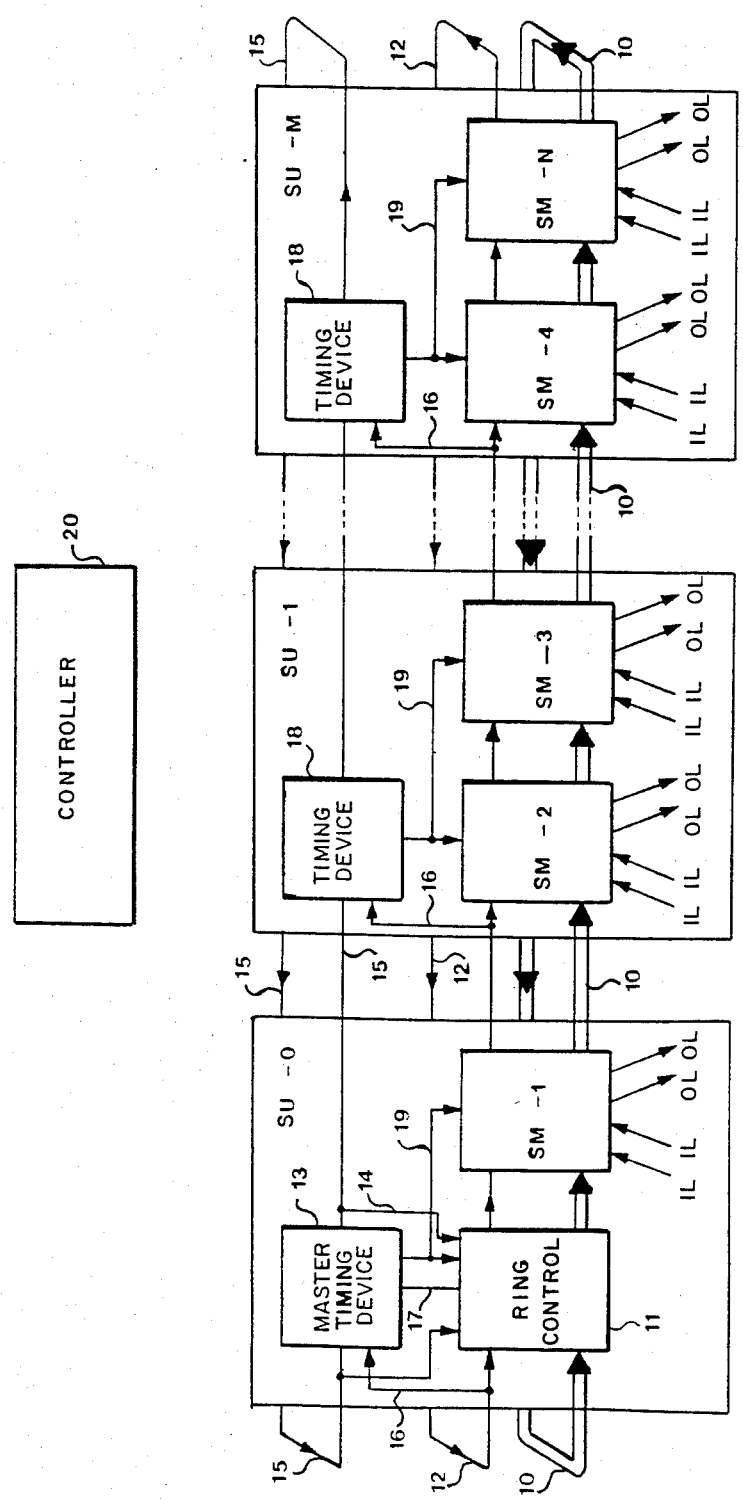

United States Patent [19]

Ambroise et al.

[11] Patent Number: 4,539,678
[45] Date of Patent: Sep. 3, 1985

[54] SYNCHRONIZATION SYSTEM FOR A CLOSED-LOOP MULTIPLEX COMMUNICATION NETWORK

[75] Inventors: Modeste Ambroise, Vence; Michel Demange, Saint Jeannet, both of France; Gerald Lebizay, Larchmont, N.Y.; Jean-Marie Munier, Cagnes Sur Mer; Michel H. P. Peyronnenc, Saint Jeannet, both of France

[73] Assignee: International Business Machines Corp., Armonk, N.Y.

[21] Appl. No.: 563,494

[22] Filed: Dec. 20, 1983

[30] Foreign Application Priority Data

Dec. 29, 1982 [EP] European Pat. Off. ........ 82430043.8

[51] Int. Cl.³ ............................. H04J 3/00; H04J 3/06
[52] U.S. Cl. ........................................ 370/86; 370/100; 370/108
[58] Field of Search ................... 370/86, 100, 85, 108, 370/88

[56] References Cited

U.S. PATENT DOCUMENTS 3,681,759  8/1972  Hill ......................................... 370/86
4,306,304 12/1981  Baxter et al. ........................... 370/86
4,429,386  1/1984  Graden ................................. 370/100

Primary Examiner—Douglas W. Olms
Assistant Examiner—Wellington Chin
Attorney, Agent, or Firm—John B. Frisone

[57] ABSTRACT

The contents of input time-division channels on a closed-loop link (10LO, 10HI) are stored in a memory (173) at the address supplied by an input address counter (IAC) controlled by an incoming timing signal (2MCR). The memory is read out under control of an output address counter (OAC) controlled by an outgoing timing signal (2MCT). Each time interval is divided into one read period and two write periods. Means (186) are provided to select one of the two write periods dependent on the phase relationship between the incoming and outgoing timing signals. The units connected in series by means of the closed-loop link receive a timing signal circulating on a timing loop (15) that is closed by a master timing device (13). Slave timing devices (18) inserted in the timing loop regenerate the timing signals circulating thereon and check same.

4 Claims, 15 Drawing Figures

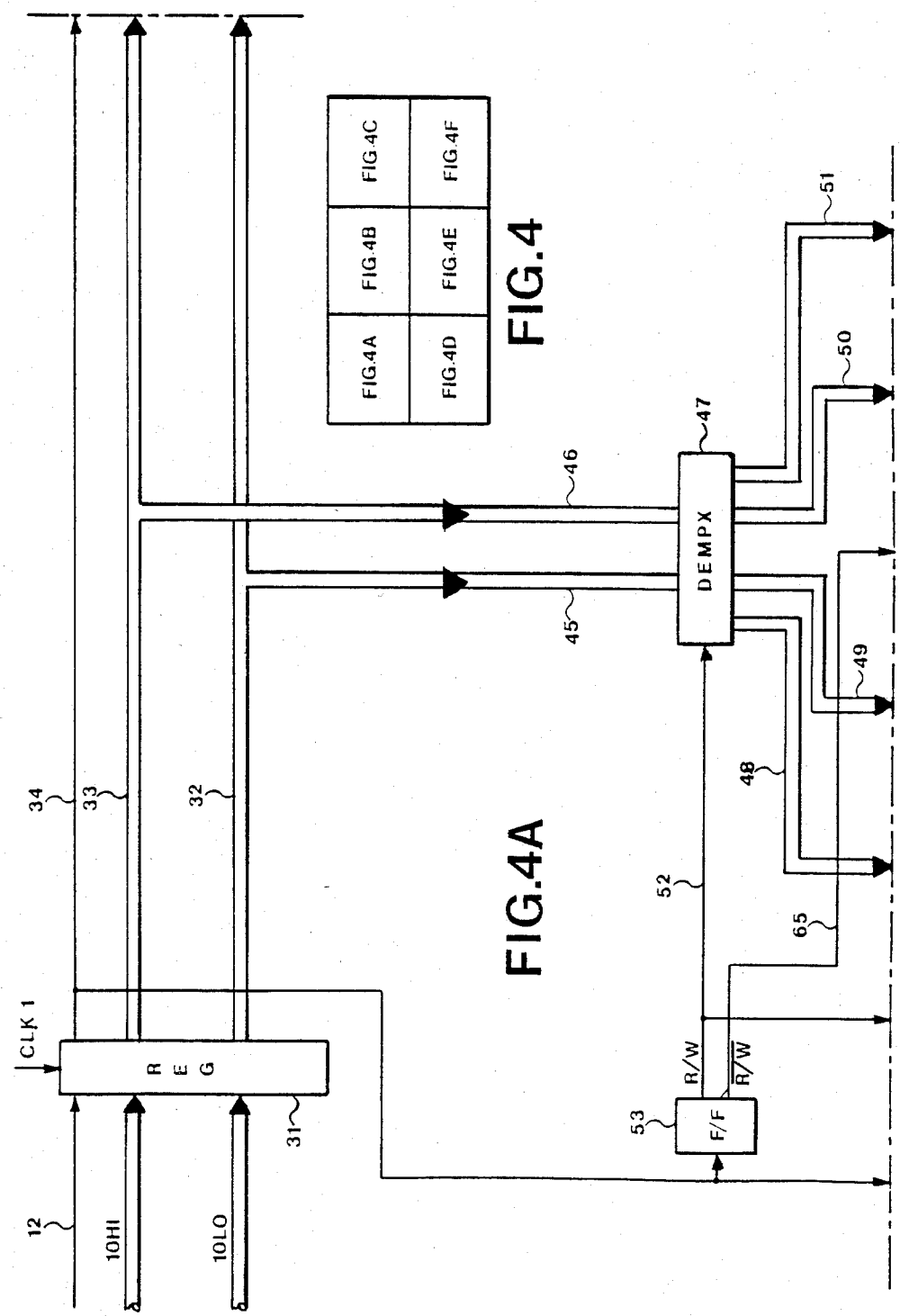

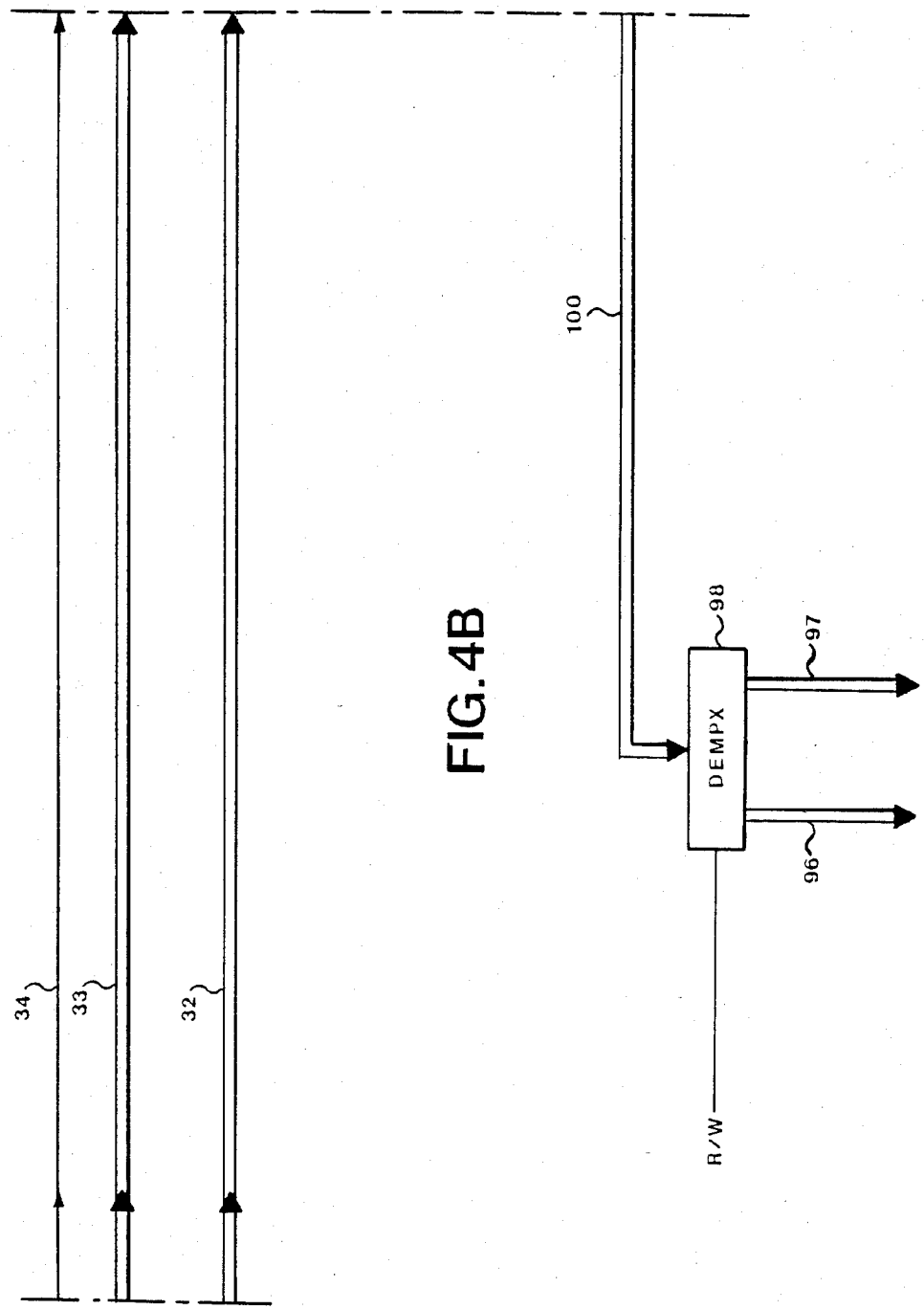

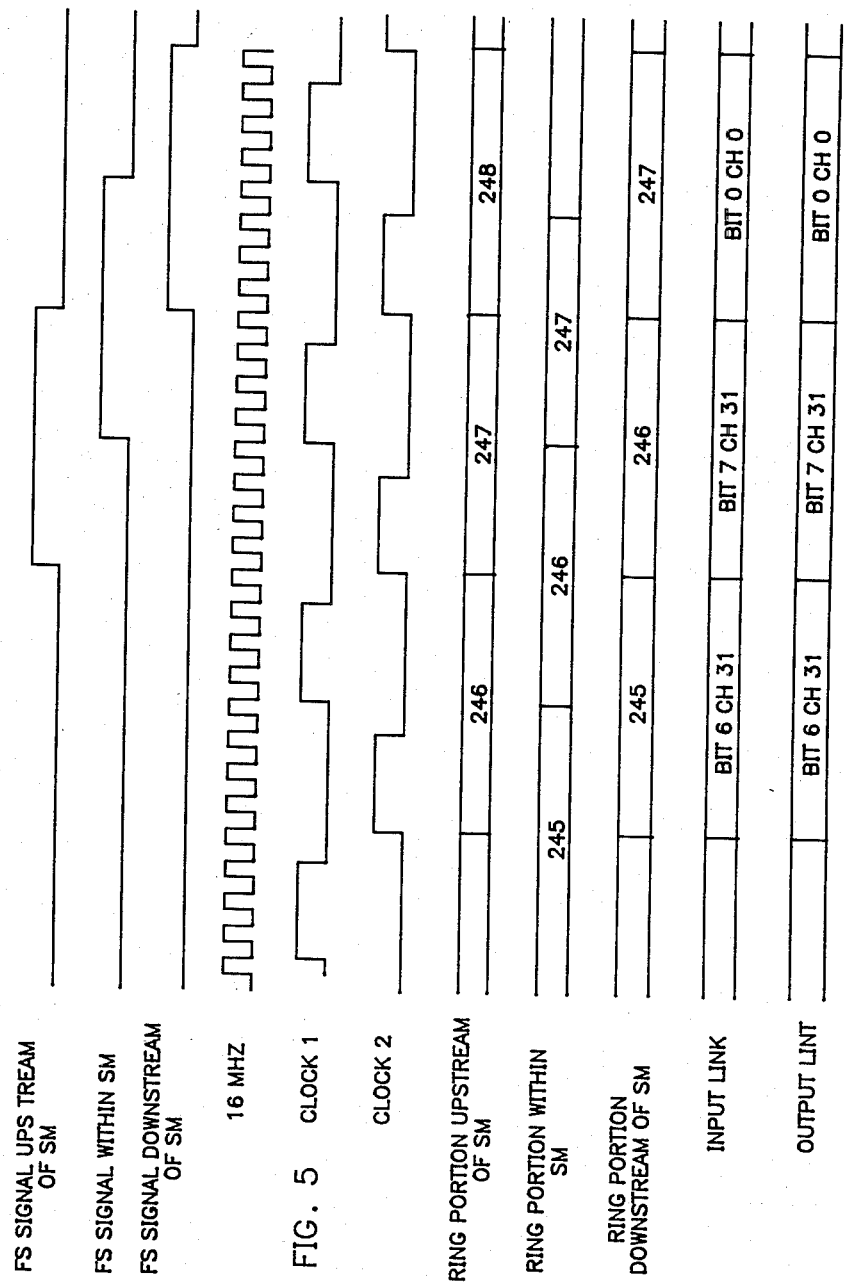

SYNCHRONIZATION SYSTEM FOR A CLOSED-LOOP MULTIPLEX COMMUNICATION NETWORK

BACKGROUND OF THE INVENTION

1. Field of the Invention

This invention relates to multiplex communication systems wherein a plurality of units are connected in series by means of a closed-loop link operating in the time-division multiplex mode with recurrent frames of equal duration. The invention relates more particularly to a synchronization system for causing the time taken by the time-division channels to circulate around the closed-loop link to remain constant and for supplying timing signals to the units interconnected by said link. The invention is particularly suitable for synchronizing closed-loop switching networks capable of switching both voice signals and data signals, such as the network described in co-pending European patent application No. 82-4300420 and assigned to the assignee of this application.

2. Prior Art

In switching networks wherein a plurality of switching modules are connected in series by means of a closed-loop link operating in the time-division multiplex mode and capable of switching voice signals, the regulation of the propagation times of the signals traveling on said link is of great importance, as the following will show. In such networks, the time available is divided into recurrent frames of equal duration and a multiplex message carrying a number of time-division channels and having a duration equal to that of one of said frames circulates continuously on the closed-loop link. To establish a connection between a transmitting station and a receiving station, a time-division channel is allocated to the receiving station and the transmitting station transfers thereto via said channel a sample of the voice signal at the occurrence of each frame. Since the voice signal samples are produced by the transmitting station at a regular rate, usually 8 KHz, it is essential that the time-division channel allocated to the receiving station be available to the transmitting station at the same rate. Accordingly, it is necessary to provide a synchronization system to cause the propagation time of the multiplex message around the closed-loop link to remain constant and equal to the duration of a frame. Obviously, it is also necessary to ensure that the various modules of the switching network are provided with suitable timing signals to enable them to intercept the incoming time-division channels.

U.S. Pat. No. 3,681,759 describes a loop synchronizing device for a multiplex communication system in which the time-division channels carry data at different speeds. The device is mainly comprised of a high-speed buffer, a medium-speed buffer and a low-speed buffer, into which the contents of the input time-division channels are selectively written under the control of an input timing signal and from which they are read under the control of an output timing signal. Such a device is extremely complex and unsuitable for synchronizing voice signals on a loop.

U.S. Pat. No. 4,071,706 describes a loop synchronizing device that is much simpler than the preceding one but is designed to be used with a loop on which data bursts are traveling, rather than with a loop link operating in the time-division multiplex mode. This device is mainly comprised of a buffer into which the incoming data bursts are written and out of which they are read under the control of the same timing signal. Synchronization is achieved by adjusting the length of the data bursts retransmitted by the device. Such a device is not usable in time-division switching networks capable of switching voice signals.

SUMMARY OF THE INVENTION

It is the object of this invention to provide a relatively simple synchronization system for causing the propagation time of the time-division channels over a closed-loop link to remain constant without altering the contents thereof.

It is another object of the invention to provide a reliable synchronization system for supplying timing signals to the various units interconnected by the closed-loop link, and for allowing synchronization losses to be quickly detected.

Generally, the invention provides a synchronization system for a communication system wherein a plurality of units are connected in series by means of a unidirectional closed-loop link which operates in the time-division multiplex mode with recurrent frames of equal duration each of which is divided into a plurality of equal time intervals during which the closed-loop link carries a plurality of time-division channels, said system including a loop control means inserted in the closed-loop link and:

a random access memory, input means for applying the contents of the closed-loop link upstream of the loop control means to the data input of the memory, output means for applying the output data from the memory to the closed-loop link downstream of the loop control means, first counter means for sequentially generating input addresses under the control of an incoming timing signal, and for supplying during each of said time intervals an input address specifying the memory location where the output from said input means is to be stored, second counter means for sequentially generating output addresses under the control of an outgoing timing signal and for supplying during each of said time intervals an output address specifying the memory location whose contents are to be read out, means for controlling read operations to be performed in the memory during the fixed readout period within each time interval, and means for selectively controlling write operations to be performed in the memory during one of two fixed write periods dependent upon the delay of the incoming timing signal relative to the outgoing timing signal.

Figure 2:
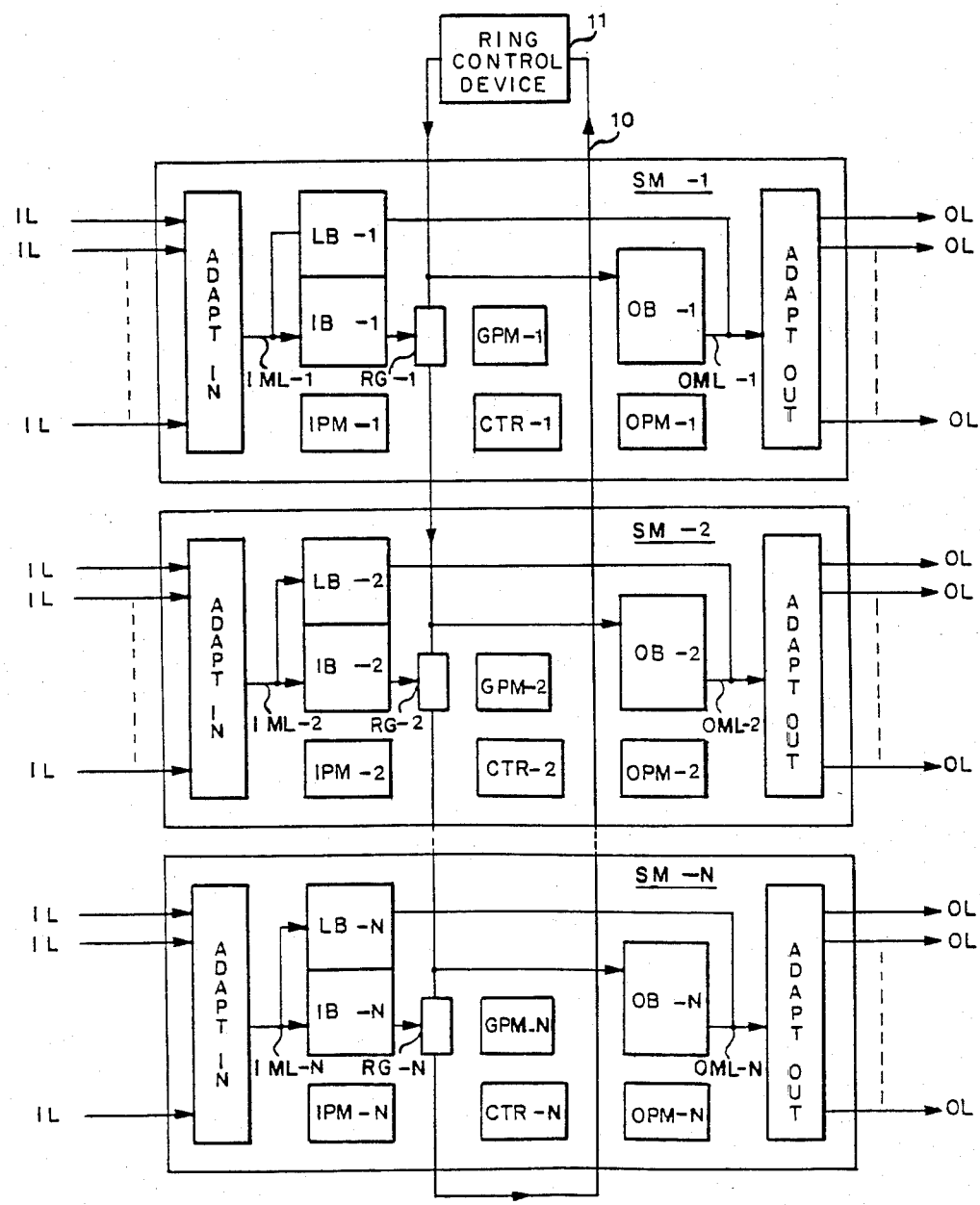

In accordance with one aspect of the invention, the synchronization system includes:

a closed-loop timing link closed by a master timing device which provides thereon said outgoing timing signal, and receives therefrom said incoming timing signal, and a plurality of slave timing devices inserted in the closed loop timing link to regenerate the timing signal circulating thereon, each of said slave timing devices deriving from the regenerated signal a timing signal whose frequency is higher than that prised of an output buffer OB the input of which is connected to the ring and the output of which is connected to the output multiplex link OML. The output buffer OB contains a number of storage locations equivalent to the number of exchange channels provided in a frame, and is selectively addressed under the control of the counter CTR or an output pointer memory OPM. The local time switch is mainly comprised of a local buffer LB the input of which is connected to the input multiplex link IML and the output of which is connected to the output multiplex link OML. The local buffer LB is similar to the output buffer OB and is selectively addressed under the control of the counter CTR or a local pointer memory LPM. In FIG. 2, the various elements of switching modules SM-1, SM-2 and SM-N are identified by means of suffixes 1, 2 and N, respectively.

The switching network of FIG. 2 provides considerable flexibility in switching data channels and voice channels, as the examples given below will show.

BIDIRECTIONAL COMMUNICATIONS BETWEEN TWO STATIONS RESPECTIVELY ATTACHED TO DIFFERENT SWITCHING MODULES

Figure 3:
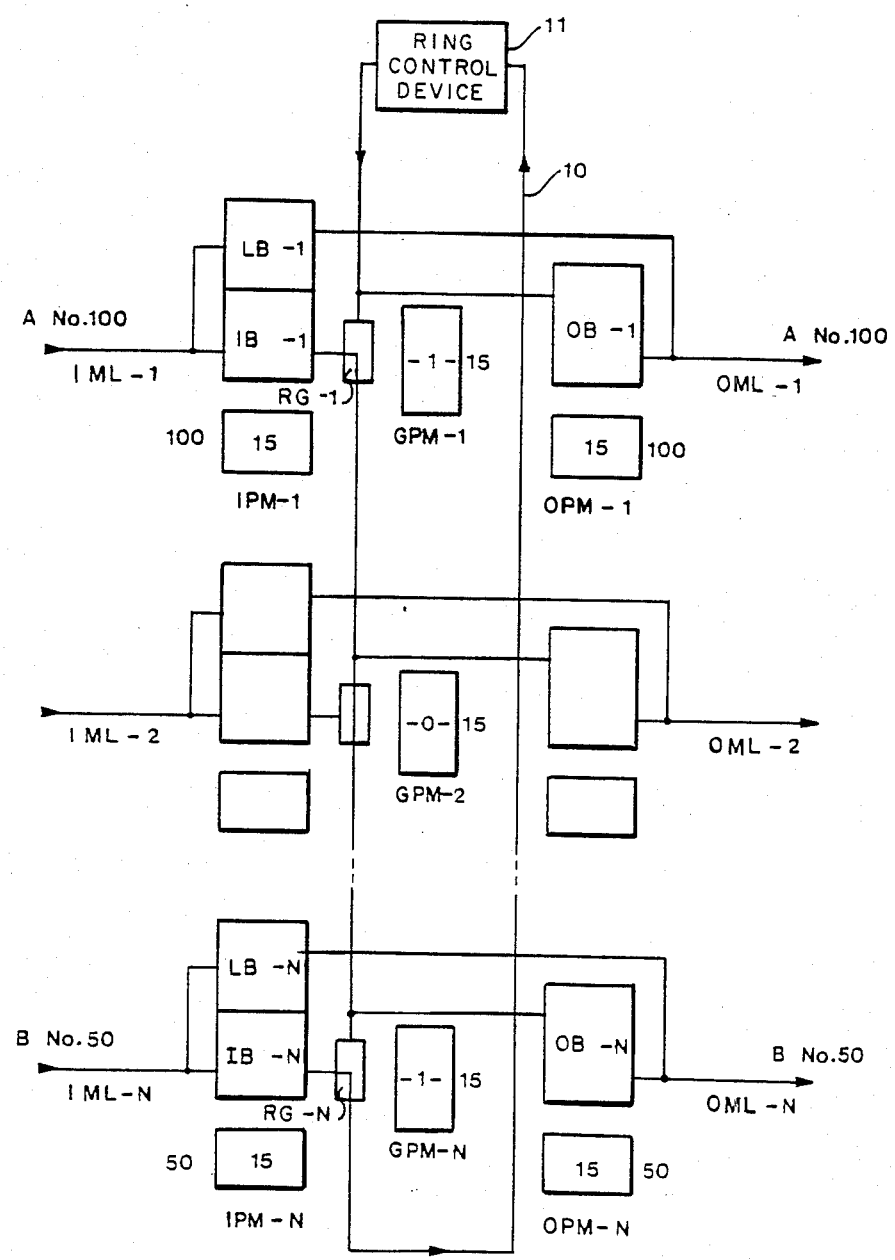

FIG. 3 is a schematic illustration of a connection established between two stations A and B respectively attached to switching modules SM-1 and SM-N. Assume that controller 20 which manages the switching network has allocated channel 100 on multiplex links IML-1 and OML-1 to station A and channel 50 on multiplex links IML-N and OML-N to station B. To establish a connection between stations A and B, controller 20 must find an available exchange channel on the ring. Assume further that exchange channel 15 is available and has been allocated to this particular connection. The pointer memories are loaded as follows:

the 15$^{th}$ storage location in each of gate pointer memories GPM-1 and GPM-N is set to "1" and the 15$^{th}$ storage location in each of the other gate pointer memories of the network is set to "0"; and the address "15" is written in storage location 100 of pointer memories IPM-1 and OPM-1 and, in location 50 of pointer memories IPM-N and OPM-N.

CONNECTIONS FROM A TO B

In each switching module, the actuation of the time slot counter CTR is synchronized with the occurrence of the exchange channels on the ring and the channels on multiplex links IML and OML. During a given cycle of 125 microseconds, such as cycle n, counter CTR-1, upon reaching the count of 100, addresses storage location 100 of input pointer memory IMP-1, the input pointer read out of this location addresses location 15 of input buffer IB-1, and the 8-bit byte from station A that is present on channel 100 of input multiplex link IML-1 is stored in location 15 of input buffer IB-1. During the next cycle, upon reaching the count of 15, counter CTR-1 addresses the 15th storage location of gate pointer memory GPM-1, the gate pointer read out of that location causes ring gate RG-1 to couple the output of input buffer IB-1 to the ring, and the contents of the 15th storage location IB-1 are placed onto exchange channel 15. When channel 15 reaches switching module SM-N, the contents thereof are stored in storage location 15 of output buffer OB-N under control of counter CTR-N. During the next cycle, counter CTR-N, upon reaching the count of 50, addresses storage location 50 of output pointer memory OPM-N, the output pointer read out of that location addresses storage location 15 of output buffer OB-N and the contents thereof, that is, the 8 bits from station A, are placed onto channel 50 of output link OML-N to be transferred to station B. The process just described is repeated during each cycle until such time as the connection from A to B is terminated.

CONNECTIONS FROM B TO A

Connections from B to A are similar to connections from A to B. It should however be noted that, in both cases, the same exchange channel, 15, is always used. In the previous example, when exchange channel 15 reached switching module SM-N, the 8-bit byte from station A that was present on channel 15 was transfered to station B. This byte is here replaced by a byte received from station B through ring gate RG-N, input buffer IB-N and channel 50 on input link IML-N. Exchange channel 15, which now carries the byte from station B, is propagated around the ring and through ring control device 11, and its contents are loaded in storage location 15 of output buffer OB-1 to be transferred to station A via channel 100 of output multiplex link OML-1.

Figure 4D:
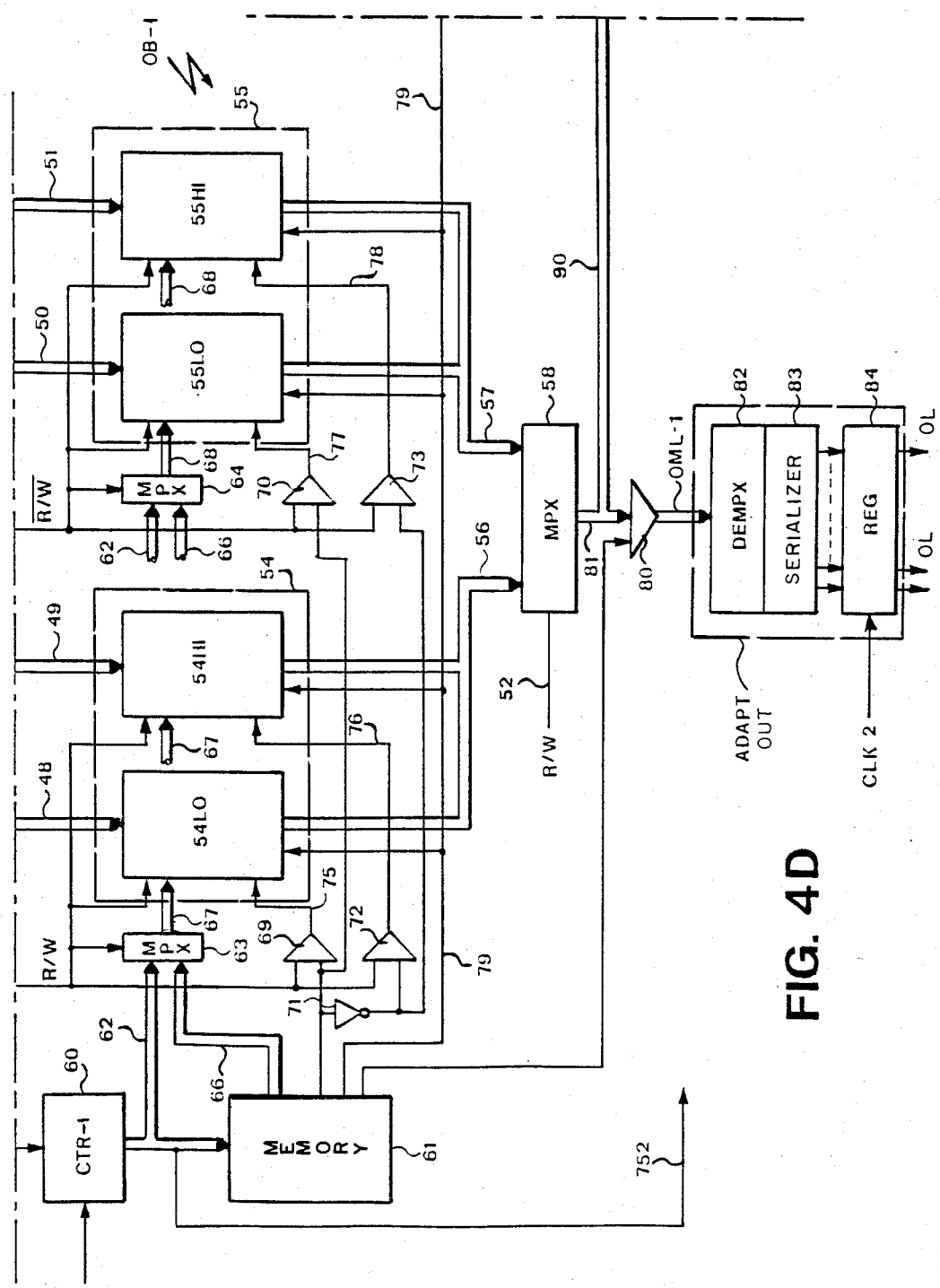
Figure 4E:
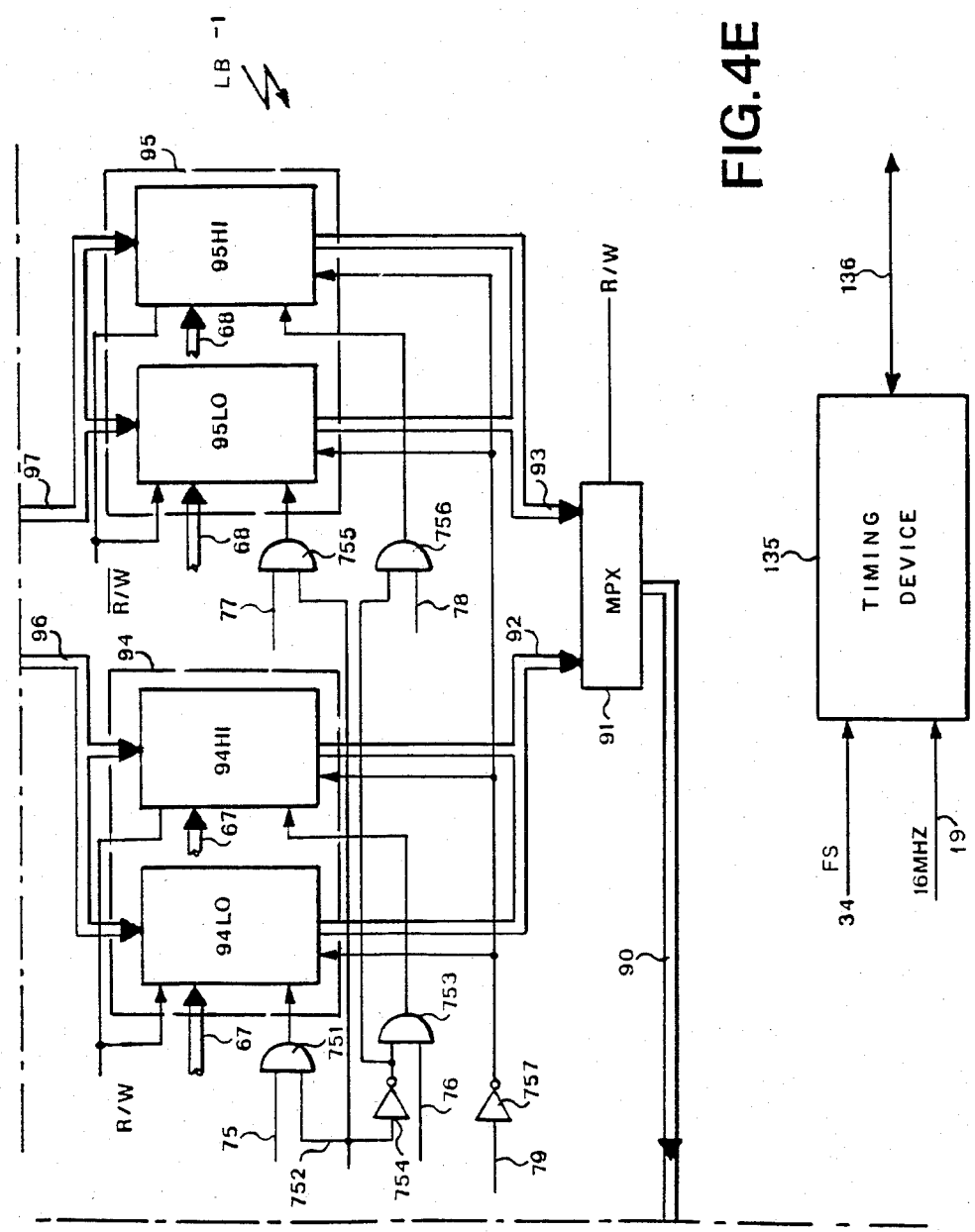
Figure 4F:
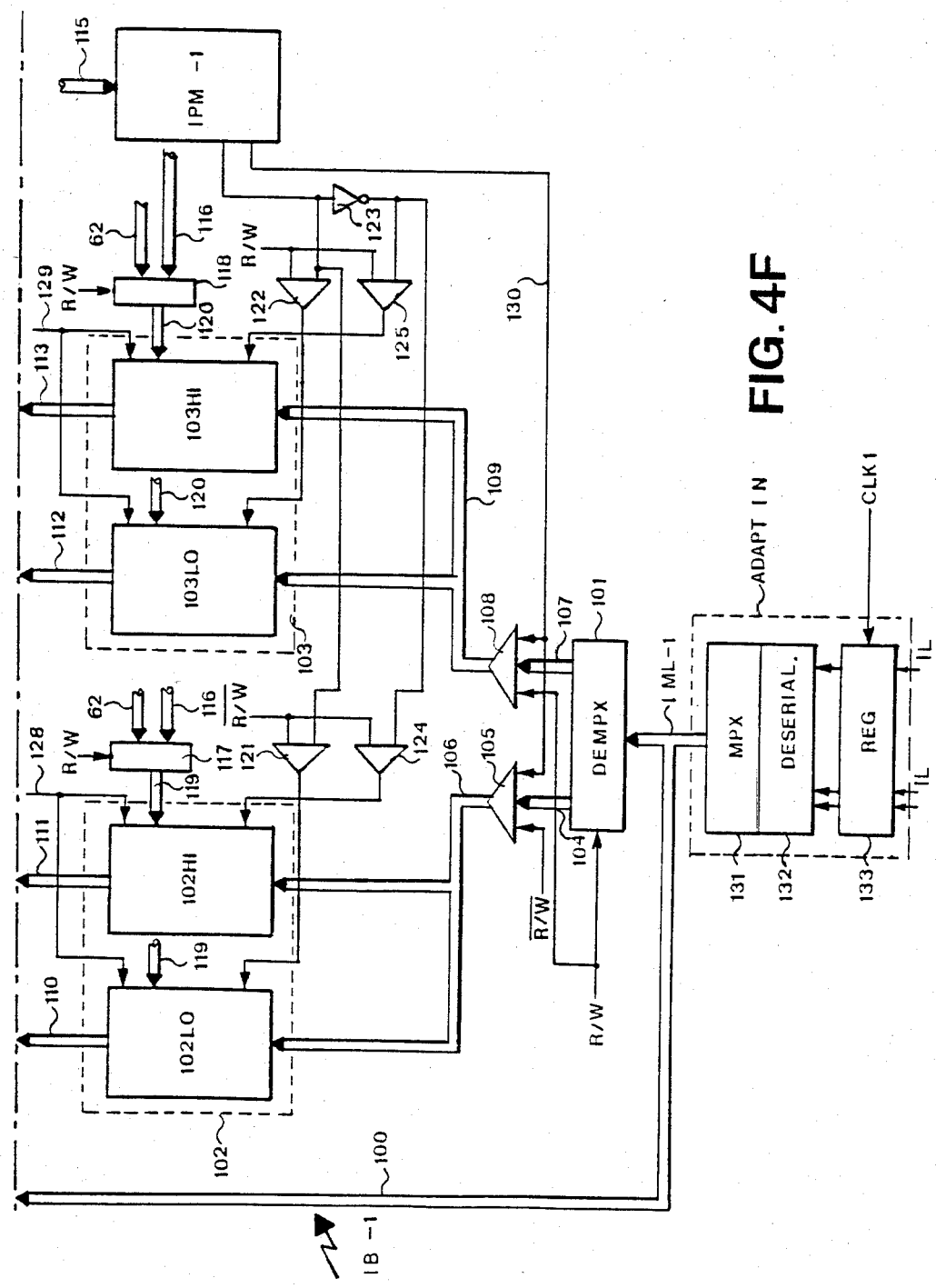

FIG. 4, which is comprised of FIGS. 4A-4F, is a detailed block diagram of a switching module, for example SM-1. In the embodiment shown in this figure, ring 10 carries two parallel exchange channels and consists of a 16-conductor bus capable of transferring two 8-bit bytes simultaneously and in parallel. For clarity, this bus is shown in FIG. 4 as two 8-conductor buses designated 10LO and 10HI. Each 125-microsecond frame is divided up into 256 time intervals called exchange time slots during each of which each bus 10LO, 10HI carries an exchange channel one 8-bit byte wide. Thus, the two buses 10LO and 10HI are equivalent to one bus operating in the time-division multiplexing mode with 125-microsecond frames comprising 512 exchange channels each. The advantage of using two parallel buses as in the arrangement just described is that it reduces the bit rate on each conductor to 2.048 Mbps and the duration of an exchange time slot to 488 nanoseconds.

The signals on buses 10LO, 10HI and synchronization line 12 upstream of the switching module are applied to a 17-stage input register 31 under the control of a 2.048 MHz timing signal CLK1. The outputs of register 31 that correspond to buses 10LO and 10HI are respectively connected to two 8-conductor buses 32 and 33 which are in turn connected to ring gate RG-1. The output of register 31 that corresponds to synchronization line 12 is connected by a line 34 to one of the seventeen inputs of an output register 35, which also receives as inputs two 8-conductor buses 36 and 37 connected to the output of ring gate RG-1. The signals on line 34 and buses 36, 37 are applied to register 35 under the control of a 2.048 MHz timing signal CLK2. The outputs of register 35 that correspond to line 34 and buses 36, 37 are respectively connected to synchronization line 12, and to buses 10LO, 10HI downstream of the switching module.

Ring gate RG-1, which also receives as inputs two 8-conductor buses 38 and 39, is mainly comprised of two multiplexers 40 and 41. Multiplexer 40 selectively connects either of input buses 32 and 38 to output bus 36, while multiplexer 41 selectively connects either of input buses 33 and 39 to output bus 37. Ring gate RG-1 further includes an arrangement of logic gates 42 which controls multiplexers 40 and 41 as a function of the contents of buses 32, 33, 38, 39 and of the logic value of two gate pointers designated LO and HI, as will be explained later.

The LO and HI gate pointers are contained in gate pointer memory GPM-1 (FIG. 2) comprised of two storage modules of 256×1 bits each, labeled 43LO and 43HI, that respectively store the LO and HI gate pointers corresponding to the exchange channels on buses 10LO and 10HI. The LO and HI gate pointers read from memory GPM-1 are fed to the arrangement of logic gates 42.

Buses 32 and 33 are further connected by two buses 45 and 46, respectively, to the input of a demultiplexer 47 which operates to selectively couple buses 45, 46 to a pair of buses 48, 49 or to another pair of buses 50, 51 under control of a R/W signal received as input via a line 52. Line 52 is connected to the "true" output of a flip-flop 53 which receives as input the frame synchronizing (FS) signal via line 34. The two pairs of buses 48, 49 and 50, 51 are connected to output buffer OB-1 (FIG. 2) which comprises two buffers 54 and 55 operating in a so-called flip-flop mode to be explained later. Buffers 54 and 55 are comprised of two storage modules each, designated 54LO, 54HI and 55LO 55HI, respectively, and storing 256×8 bits each. Buses 48, 49, 50, 51 are respectively connected to the Data inputs of modules 54LO, 54HI, 55LO, 55HI. The Data outputs of modules 54LO and 54HI are connected to each other and to an 8-conductor bus 56. The Data outputs of modules 55LO and 55HI are connected to each other and to an 8-conductor bus 57. Buses 56 and 57 are in turn connected to a multiplexer 58 controlled by the R/W signal present on line 52. The R/W signal is applied to the Read/Write inputs of modules 54LO and 54HI, while the R/W signal obtained at the "complement" output of flip-flop 53 is applied to the Read/Write inputs of modules 55LO and 55HI.

Output buffer OB-1 is addressed by a time slot counter CTR-1 60 and by a pointer memory 61 that combines the functions performed by pointer memories OPM-1 and LPM-1 of FIGS. 2 and 3. Counter 60 is a nine-stage counter which operates to count 4.096 MHz timing pulses and thus define $2^9 = 512$ time intervals of 244 nanoseconds each. Counter 60 is actuated in synchronism with the FS signal present on line 34, which forces the contents of counter 60 to go to 247 whenever applied thereto, for reasons to be described later with reference to FIG. 5. The eight most significant bits of counter 60 are applied via a bus 62 to a couple of multiplexers 63 and 64 respectively controlled by the R/W and $\overline{RW}$ signals. The nine bits of counter 60 are used to address pointer memory 61 which comprises 512 storage locations capable each of storing an 11-bit output/local pointer consisting of:

8 Address bits
1 LO/HI bit
1 Local bit
1 Output Marker bit

The eight Address bits read out of pointer memory 61 are applied via a bus 66 to the other input of multiplexer 63, whose output is connected by a bus 67 to the Address inputs of modules 54LO and 54HI, and to the other input of multiplexer 64 whose output is connected by a bus 68 to the Address inputs of modules 55LO and 55HI. The LO/HI bit read from pointer memory 61 is applied to one input of an AND gate 69 whose other input receives the R/W signal. This bit is further applied to one input of an AND gate 70 whose other input receives the R/W signal, and to an inverter 71. The output from inverter 71 is applied to one input of an AND gate 72 whose other input receives the R/W signal, and to one input of an AND gate 73 whose other input receives the R/W signal. The outputs from AND gates 69, 72, 70 and 73 are respectively applied to the Select inputs of storage modules 54LO, 54HI, 55LO and 55HI via lines 75, 76, 77 and 78, respectively. The Local bit read from pointer memory 61 is applied via a line 79 to the Data Output Gates of modules 54LO, 54HI, 55LO and 55HI. The Output Marker bit read from memory 61 is applied to a gate 80 as one input thereto. Gate 80 also receives the output from multiplexer 58 as a second input via a bus 81. The output of gate 80 is connected to an 8-conductor bus forming the output multiplex link OML-1 of FIG. 2.

Bus OML-1 is connected to output adapter ADAPT OUT (FIG. 2) comprising a demultiplexer 82, a 16-output serializer 83 and a 16-stage register 84. The sixteen outputs from serializer 83 are loaded into register 84 under control of the CLK2 timing signal. The sixteen outputs of register 84 are connected to the sixteen output interface links OL (FIG. 2). Device 82 demultiplexes the 512 channels on bus OML-1 into sixteen 32-channel links, and is conventionally comprised of a 16-position switch controlled by a 4.096 MHz timing signal, each of which positions enables the contents of bus OML-1 to be loaded in parallel into an 8-stage register. The contents of the sixteen registers of demultiplexer 82 are loaded sequentially and in parallel at a rate of 256 KHz into the sixteen shift registers of serializer 83, the contents of each of which are then transferred serially at a rate of 2.048 MHz onto the corresponding output interface link OL. The relationship between the channels of bus OML-1 and those of links OL is shown in Table I below.

TABLE I

| OML-1 Channel No | 0 | 1 | 2 | ... | 15 | 16 | ... | 510 | 511 |
|---|---|---|---|---|---|---|---|---|---|
| OL Channel No | 0 | 0 | 0 | ... | 0 | 1 | ... | 31 | 31 |
| OL No | 1 | 2 | 3 | ... | 16 | 1 | ... | 15 | 16 |

Bus 81 is connected by means of a bus 90 to the output of a multiplexer 91 whose inputs are connected to a couple of buses 92 and 93 and which operates under control of the R/W signal. Buses 92 and 93 are connected to the output of local buffer LB-1, which is similar to output buffer OB-1 and comprises two buffers 94 and 95 operating in the flip-flop mode, each of which includes two storage modules, designated 94LO, 94HI, 95LO, and 95HI, storing 256×8 bits each. Bus 92 is connected to the Data output of modules 94LO and 94HI while bus 93 is connected to the Data output of modules 95LO and 95HI. The data inputs of modules 94LO and 94HI are connected to each other as well as to a bus 96. The Data inputs of modules 95LO and 95HI are connected to each other as well as to a bus 97. Buses 96 and 97 are connected to the outputs of a demultiplexer 98 operating under control of the R/W signal. The R/W signal is applied to the Read/Write inputs of modules 94LO and 94HI via line 52 while the R/W signal is applied to the Read/Write inputs of modules 95LO and 95HI via line 65. Bus 67 is connected to the Address inputs of modules 94LO and 94HI, while bus 68 is connected to the Address inputs of modules 95LO and 95HI. The output from an OR gate 751 is applied to the Select input of module 94LO OR gate 751 receives as inputs the logic level present on line 75 and the least significant bit of the count of counter 60 that is applied thereto via a line 752. The Select input of module 94HI receives the output from an OR gate 753, which receives as inputs the logic level present on line 76 and that present on line 752 as inverted by an inverter 754. The output from an OR gate 755, which receives as inputs the logic levels on lines 77 and 752, is applied to the Select input of module 95LO. The Select input of module 95HI is supplied with the output from an OR gate 756, which receives as inputs the logic level on line 78 and the output from inverter 754. The Data Output Gate inputs of modules 94LO, 94HI, 95LO and 95HI are connected to the output of an inverter 757 which receives as input the logic level on line 79.

Demultiplexer 98 has its input connected by a bus 100 to an 8-conductor bus constituting the input multiplex link IML-1 of FIG. 2. Bus IML-1 is connected through a demultiplexer 101 to input buffer IB-1, which is similar to buffers LB-1 and OB-1. Buffer IB-1 is comprised of two buffers 102 and 103, each of which includes two storage modules storing 256×8 bits each. These modules are designated 102LO, 102HI, 103LO and 103HI. A bus 104 connects a first output of demultiplexer 101 to an AND gate 105 whose output is connected by a bus 106 to the Data inputs of storage modules 102LO and 102HI. A bus 107 connects a second output of demultiplexer 101 to an AND gate 108 whose output is connected by a bus 109 to the Data inputs of storage modules 103LO and 103HI. The Data outputs of modules 102LO, 102HI, 103LO and 103HI are respectively connected via buses 110, 111, 112 and 113 to a multiplexer 114 which is controlled by the R/W signal and whose output is connected to buses 38 and 39.

Input buffer IB-1 is addressed by the time slot counter 60 and the input pointer memory IPM-1. Memory IPM-1 comprises 512 storage locations each of which can store a 10-bit input pointer consisting of:

8 Address bits,
1 LO/HI bit, and
1 Input Marker bit

Input pointer memory IPM-1 is addressed by means of the nine bits received from counter 60 via a bus 115. The eight Address bits read out of memory IPM-1 are supplied via a bus 116 to a couple of multiplexers 117 and 118 that also receive the count of counter 60 via bus 62 and operate under the control of the $\overline{R/W}$ and R/W signals, respectively. The output from multiplexer 117 is applied via a bus 119 to the Address inputs of storage modules 102LO and 102HI, and the output from multiplexer 118 is applied via a bus 120 to the Address inputs of storage modules 103LO and 103HI. The LO/HI bit read out of input pointer memory IPM-1 is applied as one input to a couple of AND gates 121 and 122 which receive as a second input the $\overline{R/W}$ and R/W signals, respectively. The LO/HI bit is also applied to an inverter 123 whose output is coupled as one input to a pair of AND gates 124 and 125 which also receive as a second input the $\overline{R/W}$ and R/W signals, respectively. The outputs from AND gates 121-125 are respectively applied to the Select inputs of storage modules 102LO, 102HI, 103LO and 103HI. Input buffer IB-1 is provided with a conventional device that resets to zero the storage locations after the contents thereof have been read out. This device includes an AND gate 126, which receives as inputs the R/W signal and the 4.096 MHz timing signal, and an AND gate 127, which receives as inputs the same timing signal and the $\overline{R/W}$ signal. The output of AND gate 126 is connected via a line 128 to the Read/Write inputs of storage modules 102LO and 102HI, while the output of AND gate 127 is connected via a line 129 to the Read/Write inputs of modules 103LO and 103HI. The Input Marker bit read out of pointer memory IPM-1 is applied as one input via a line 130 to AND gates 105 and 108 which receive as a second input the $\overline{R/W}$ and R/W signals, respectively.

Bus IML-1 is connected to the output of input adapter ADAPT IN (FIG. 2), which is similar to output adapter ADAPT OUT and includes a multiplexer 131 and a deserializer 132 the sixteen inputs of which are supplied with the sixteen outputs of a register 133 under control of the CLK2 timing signal. The inputs of register 133 are connected to the sixteen input interface links IL (FIG. 2).

Pointer memories 61, IPM-1 and GPM-1 are written into under control of a control and timing device 135. Device 135 receives the frame synchronizing (FS) signal via line 34 and the 16.384 MHz timing signal via line 19 and is connected to controller 20 by means of a bidirectional serial link 136. An exemplary embodiment of device 135 is described in co-pending European patent application No. 82-4300420, assigned to the assignee of this application.

The operation of the switching module SM-1 of FIG. 4 will now be described. The switching module performs four main functions, which are:

to intercept exchange channels,
to establish input connections,
to establish output connections,
to establish local connections.

INTERCEPTION OF EXCHANGE CHANNELS

Before describing this function, the manner in which exchange channels circulate on the ring will be described with reference to the timing diagram of FIG. 5. The CLK1 and CLK2 timing signals both have a frequency of 2.048 MHz, with CLK2 being delayed by half a period with respect to CLK1. The two exchange channels, say channels 246, present on buses 10HI and 10LO upstream of switching module SM-1 are applied thereto (i.e. to the input of register 31) during the time interval defined by the CLK2 signal associated with the immediately preceding switching module. The contents of exchange channels 246 are loaded into register 31 at the next positive-going transition of the CLK1 signal and remain therein until the next positive-going transition of CLK1 that is, throughout the duration of an exchange time. The contents of register 31 (ignoring for the moment the action of ring gate RG-1) are loaded into register 35 and will thus be sent over the downstream portion of the ring at the next positive-going transition of the CLK2 signal. Thus, the switching module introduces a delay equal to one exchange time slot in the propagation of the exchange channels around the ring. To compensate for this delay, the frame synchronizing signal on line 12 is caused to be delayed by an equivalent time interval through the use of registers 31 and 35.

The frames on the ring are synchronized with those on the input and output interface links and on the input and output multiplex links. To achieve synchronism at the input and output interface links (that is, to ensure that, for example, channel 31 is present on the output interface link at the same time as channel 31 on the corresponding input interface link is present thereon) and to take into account the delay introduced by the processing of a channel in the switching module, the frame synchronizing (FS) signal occurs during exchange time slot 247 rather than during exchange time slot 0. This is the reason why the FS signal forces counter 60 to go to the count of 247 instead of resetting counter 60 to zero.

Exchange channel interceptions in switching module SM-1 are carried out by ring gate RG-1, which is controlled by the gate pointers stored in pointer memory GPM-1. Memory GPM-1 is addressed by the eight most significant bits of counter 60 which sequentially provide 256 individual addresses at the rate of one address every 488 nanoseconds, i.e. at the rate at which the exchange time slots are provided. Counter 60 is synchronized with the loading of the contents of the exchange channels into register 31 under control of the FS signal. The address supplied by counter 60 is applied in parallel to storage modules 43LO and 43HI so that during each exchange time slot pointer memory GPM-1 can simultaneously provide the LO and HI gate pointers corresponding to the exchange channels on buses 32 and 33. The LO and HI gate pointers control ring gate RG-1 as shown in Table II below. For example, if LO gate pointer 246 is set to "1", indicating that exchange channel 246 on the LO bus is to be intercepted, then, during exchange time slot 246, multiplexer 40 disconnects bus 32 from bus 36 and connects bus 38 to bus 36. The contents of bus 38 are thus placed onto LO exchange channel 246 for transfer to the ring downstream of switching module SM-1. If LO gate pointer 246 is set to "0", then the operation of ring gate RG-1 is dependent upon the contents of exchange channel 246 on bus 32 and those of bus 38, as shown in Table II below.

TABLE II

| LO Gate Pointer (HI Gate Pointer) | Contents of bus 32 (contents of bus 33) | Contents of bus 38 (contents of bus 39) | Connection |
|---|---|---|---|
| 1 | Zero or non zero | Zero or non zero | 38–36 (39–37) |
| 0 | Zero | Zero | 32–36 (33–37) |
| 0 | Non Zero | Zero | 32–36 (33–37) |
| 0 | Zero | Non Zero | 38–36 (39–37) |
| 0 | Non Zero | Non Zero | 32–36 (33–47) |

In a simplified embodiment, the ring gate could operate in a binary mode, regardless of the contents of the buses, in which case the logic gates 42 would be eliminated and the gate pointers would directly control multiplexers 40 and 41. In the embodiment shown in FIG. 4, the logic gates 42 whose operation is illustrated in Table II enable the network to establish an "in-cast" type of connection as described in the co-pending European patent application mentioned earlier, and allow the system to detect certain error conditions. To establish an "in-cast" connection ring gate RG-2, associated with the first transmitting station on the loop, is controlled so as to enable exchange channel 15 to be intercepted, with the corresponding gate pointer being set to "1". Ring gate RG-N, associated with station B, must be controlled in such a way that, if station C is transmitting an 8-bit byte while station B is not transmitting, ring gate RG-N will be transparent to exchange channel 15, while in the converse situation ring gate RG-N will intercept exchange channel 15. Control of the ring gate in both of the above situations would be as shown in rows 2 and 4 of Table II. If station B attempts to transmit a byte over exchange channel 15 while the latter is busy, priority will be given to the original contents of channel 15, as shown in the last row of Table II, and an error condition will be reported to controller 20.

INPUT CONNECTIONS

An input connection allows an 8-bit byte from a channel on any one of the input interface links IL to be transferred to anyone of the exchange channels on the ring. This is achieved through the use of input buffer IB-1. The 512 channels of the input multiplex link, which are obtained by multiplexing the channels of the input interface links, are stored in input buffer IB-1 at the addresses specified by the input pointers, and the contents of the buffer are sequentially read out thereof under control of time slot counter 60. In practice, either of buffers 102 and 103 is written into throughout the duration of a frame while the contents of the other buffer are read out and sent over the ring, then the buffer just written into is read out, and so on. This mode of operation is termed "flip-flop mode" hereinafter.

Assume that during a given frame, say frame n, buffer 102 is being written into while the contents of buffer 103 are being read out. Throughout the duration of frame n, the R/W signal obtained at the true output of latch 53 is low, and demultiplexer 101 connects bus IML-1 to bus 104 while multiplexer 114 connects buses 112, 113 to buses 38, 39 and multiplexer 117 connects the output of input pointer memory IPM-1 to the Address inputs of storage modules 102LO and 102HI. As the R/W signal is low, the output from AND gate 126 is forced to go low, thereby setting storage modules 102LO and 102HI to the Write mode. The $\overline{R/W}$ signal is high and enables AND gates 105, 121, and 124. The contents of the channels on bus IML-1 are stored in module 102LO as explained in the following example. Assume that the contents of channel 46 on bus IML-1 are to be transferred to exchange channel 65 on the HI bus. When channel 46 occurs on bus IML-1, the count defined by the nine bits of counter 60 is equal to "46" and the input pointer stored in the 46th location of the pointer memory is fetched therefrom. This input pointer has the following configuration:

| Address Bits | LO/HI Bit | Marker Bit |
|---|---|---|
| 01000001 | 1 | 1 or 0 |

The Address field specifies the address "65" which is applied to storage modules 102LO and 102HI. Since the LO/HI bit is "1" and is inverted by inverter 123, the Select input of module 102HI is forced to go low, thereby selecting this module. Module 102LO is not selected. If the Marker bit is "1", AND gate 105 is enabled and the contents of channel 46 on bus IML-1 are loaded into location 65 of module 102HI. If the Marker bit is "0", AND gate 105 is inhibited and an all-zero byte is loaded in this storage location.

During frame n+1, the R/W signal is high, demultiplexer 101 connects bus IML-1 to bus 107, multiplexer 114 connects buses 110, 111 to buses 38, 39, and multiplexer 117 connects bus 62, whose contents consist of the eight most significant bits of the count of counter 60, to the Address inputs of storage modules 102LO and 102HI. The $\overline{R/W}$ signal is low and selects both modules through AND gates 121 and 124. The contents of modules 102LO and 102HI are simultaneously and sequentially read out under control of the eight most significant bits of the count of counter 60, the contents of storage locations 0 of the LO and HI modules are placed on exchange channels O of the LO and HI buses, this being followed by the contents of location 1, and so forth. After being read out, each storage location is reset to zero as explained earlier. Throughout the duration of frame n+1, the R/W signal is high. During a given exchange time slot, the 4.096 MHz timing signal is successively high and low. During the first half of an exchange time slot, the output from AND gate 126 is high, thereby setting storage modules 102LO and 102HI to the Read mode. During the second half of this time slot, the output from AND gate 126 is low, thereby setting modules 102LO and 102HI to the Read mode. During the second half of this time slot, the output from AND gate 126 is low, thereby setting modules 102LO and 102HI to the Write mode, the R/W signal is low, thereby forcing the output from AND gate 105 to go low, and an all-zero byte is written into the addressed storage locations that have just been read out.

OUTPUT CONNECTIONS

An output connection enables the contents of any exchange channel on the ring to be transferred to a channel on any one of the output interface links OL. The contents of the exchange channels are loaded in output buffer OB-1 under control of time slot counter 60 and the contents of output buffer OB-1 are read out under control of the output/local pointers stored in pointer memory 61. In practice, output buffer OB-1 is comprised of two buffers that operate in the flip-flop mode in the same manner as those comprising input buffer IB-1.

Assume that during frame n, buffer 54 is written into while the contents of buffer 55 are read out. The R/W signal is low, demultiplexer 47 connects buses 45, 46 to buses 48, 49, multiplexer 58 connects bus 57 to bus 81, and multiplexer 63 connects bus 62 to bus 67, which is itself connected to the Address inputs of storage modules 54LO and 54HI. Since the R/W signal is low, the effect of this signal is to place these modules in the Write mode and to select them through AND gates 69 and 72. Modules 54LO and 54HI are simultaneously and sequentially written into under control of counter 60, the contents of exchange channels O on buses 32 and 33 are stored in storage locations 0 of modules 54HO and 54HI, the contents of exchange channels 1 are stored in storage locations 1 of modules 54HO and 54HI, and so on.

During frame N+1, the R/W signal is high, multiplexer 58 connects bus 56 to bus 81, demultiplexer 47 connects buses 45, 46 to buses 50, 51, and multiplexer 63 connects bus 66 to 67, itself connected to the Address inputs of modules 54LO and 54HI. Since the R/W signal is high, storage modules 54LO and 54HI are set to the Read mode of operation and the contents thereof are read out as follows. Assume that the contents of exchange channel 45 on the LO bus, which were stored in storage location 45 of module 54LO, are to be transferred to channel 300 of bus OML-1. When counter 60 reaches the count of 300, the output/local pointer stored in location 300 of pointer memory 61 is read out. This pointer has the following configuration:

| Address Bits | LO/HI Bit | Local Bit | Marker Bit |
|---|---|---|---|
| 00101101 | 0 | 1 | 1 or 0 |

The Address field specifies address "45" and the LO/HI bit specifies module 54LO. Since it is "0", the Local bit enables the Data Output Gates in the storage modules that make up output buffer OB-1. If the Marker bit is "1", AND gate 80 is enabled and the contents of location 45 in module 54LO are placed onto bus OML-1. If the marker bit is "0", the output from AND gate 80 is forced to zero and an all-zero byte is placed onto bus OML-1.

LOCAL CONNECTIONS

A local connection enables the contents of an exchange channel on any one of the input interface links IL to be transferred to a channel on any one of the output interface links OL. The contents of the 512 channels on bus IML-1 are systematically loaded in the local buffer LB-1 under control of time slot counter 60 and the contents of local buffer LB-1 are read out under control of the output/local pointers. Buffer LB-1 is similar to input and output buffers IB-1 and OB-1 and, consequently, shall not be described in greater detail hereafter.

During frame n, buffer 94 is written into as follows. During the first 488-ns time slot, address 0 is applied via bus 67 to both storage modules 94LO and 94LI. During the first half of this time slot, the least significant bit of the count of counter 60 on line 752 is "0", storage module 94LO alone is selected, and channel 0 on bus IML-1 is loaded in storage location O of module 94LO. During the second half of the time slot, the least significant bit of counter 60 is "1", storage module 94HI alone is selected, and channel 1 on bus IML-1 is loaded in location 0 of module 95HI. This process is repeated throughout the duration of frame n.

During frame n+1, buffer 94 and buffer 54, which forms part of output buffer OB-1, are simultaneously addressed by the output/local pointers, and the Local bit in each output/local pointer determines which of buffers 94 and 54 is to be read out. For example, if channel 120 on bus IML-1 is to be connected to channel 40 on bus OML-1, then the output/local pointer read out of pointer memory 61 will have the following configuration upon counter 60 reaching a count of 40:

| Address Bits | LO/HI Bit | Local Bit | Marker Bit |
|---|---|---|---|
| 00111100 | 0 | 1 | 1 or 0 |

The Address field specifies address "60" and the LO/HI bit specifies module 94LO. As the Local bit on line 79 is "1", the output from module 54LO, which is addressed in parallel with module 94LO, is inhibited and the output from module 94LO is enabled. Accordingly, the contents of storage location 60 of module 94LO, that is, the contents of channel 120 on bus IML-1, are placed onto bus 81. If the Marker bit is "1", AND gate 80 is enabled and bus 81 is connected to bus OML-1. If the Marker bit is "0", the output from AND gate 80 is forced to zero and an all-zero byte is placed on bus OML-1.

Figure 6:
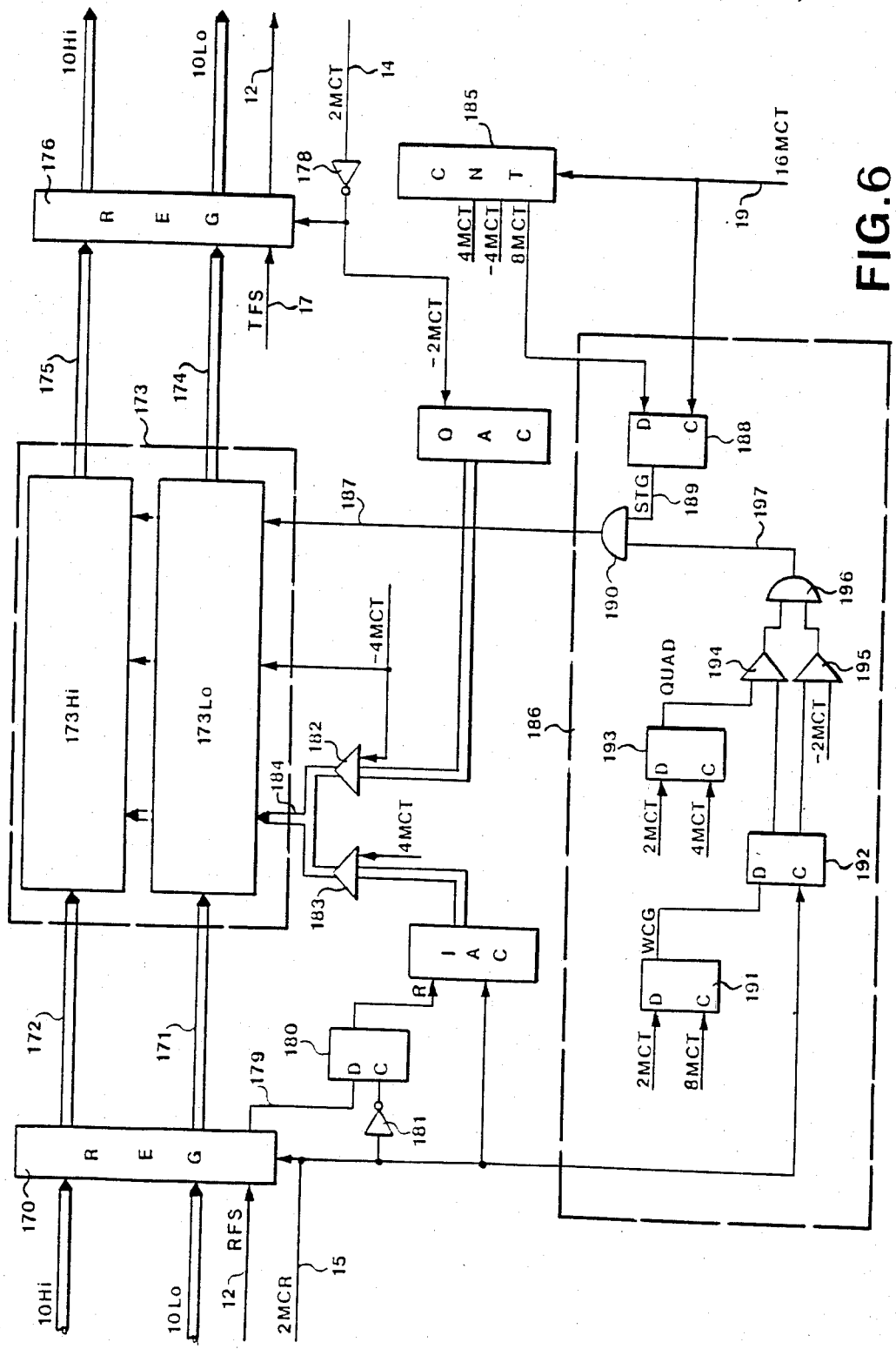

Referring now to FIG. 6, a detailed block diagram of the ring control device 11 of FIG. 1 is shown. The signals on buses 10HI and 10LO and synchronization loop 12 upstream of device 11 are fed to a 17-stage register 170 under control of the 2.048 MHz timing signal received via that portion of timing signal loop 15 which lies upstream of device 11. This timing signal will be called 2MCR signal hereafter. The outputs from register 170 that correspond to buses 10LO, 10HI are applied via two buses 171, 172 to the Data inputs of two storage modules 173LO and 173HI, storing 256×8 bits each, that comprise a memory 173. The Data outputs of storage modules 173LO and 173HI are applied via two buses 174 and 175 to a 17-stage register 176 which also receives the frame synchronizing signal to be transmitted. This signal supplied by master timing device 13 over a line 17, will be designated TFS hereafter. The outputs of register 176 that correspond to buses 174, 175 and line 17 are respectively connected to those portions of buses 10LO, 10HI and line 12 that lie downstream of device 11. The signals on buses 174, 175 and line 17 are fed to register 176 under control of a timing signal labeled −2MCT, resulting from the inversion by an inverter 178 of the 2.048 MHz timing signal supplied by master timing device 13 over line 14 and designated 2MCT. The output of register 170 that corresponds to frame synchronizing loop 12 is connected via a line 179 to the D input of a D-type flip-flop 180 whose C input receives a signal designated −2MCR that is obtained by inverting the 2MCR signal by means of an inverter 181. The 2MCR signal is applied as an input to an 8-bit input address counter IAC that is reset to zero by the output from flip-flop 180. The −2MCT signal is applied as an input to an output address counter OAC whose output is applied to an AND gate 182. The output from counter IAC is applied to an AND gate 183. The outputs of AND gates 183 and 181 are connected to each other and to a bus 184, itself connected to the Address inputs of storage modules 173LO and 173HI. A 16.384 MHz timing signal designated 16MCT that is applied by master timing device 13 is applied to a counter 185 which derives therefrom a 4.096 MHz signal designated 4MCT, the inverse thereof, designated −4MCT, and a 8.192 MHz signal designated 8MCT. The −4MCT signal is applied to the Read/Write inputs of modules 173LO and 173HI, and to AND gate 182. The 4MCT signal is applied to AND gate 183. The 16MCT, 8MCT, 4MCT, 2MCT, −2MCT and 2MCR signals are applied to a write cycle selection device 186 whose output is connected via a line 187 to the Select inputs of modules 173 LO and 173 HI. In device 186, the 8MCT and 16MCT signals are respectively applied to the D and C inputs of a D-type flip-flop 188 whose "true" output produces a signal labeled STG that is applied via a line 189 to one input of an OR gate 190, whose output is connected to line 187. The 2MCT and 8MCT signals are respectively applied to the D and C inputs of a D-type flip-flop 191 whose "true" output provides a signal designated WCG which is in turn applied to the D input of a D-type Selection flip-flop 192, whose C input receives the 2MCR signal. The 2MCT and 4MCT signals are respectively applied to the D and C inputs of a D-type flip-flop 193 whose "true" output produces a signal labeled QUAD which is fed, together with the "true" output from flip-flop 192, to an AND gate 194. The −2MCT signal and the "complement" output from flip-flop 192 are applied to a AND gate 195. The outputs from AND gates 194 and 195 are coupled to an OR gate 195 whose output is fed to OR gate via line 197.

The main function of ring control device 11 is to ensure that the time taken by the exchange channels to propagate around the ring remains constant and equal to 125 microseconds. Device 11 uses as references the signals generated by master timing device 13, i.e. the 2MCT timing signal and the transmitted frame synchronizing (TFS) signal, and sends the exchange channels down the ring in synchronism with both signals. Device 11 receives the exchange channels from the ring in synchronism with the received 2MCR signal and the received frame synchronizing (RFS) signal. Thus, the function of device 11 is to resynchronize the incoming exchange channels with the reference signals, and to transmit the resynchronized channels over the ring.

Device 11 is organized around buffer 173, which operates as an elastic buffer. The contents of the incoming exchange channels are stored in the buffer at the addresses provided by counter IAC, which operates in synchronism with the received 2MCR signal. The contents of the buffer are read out and transferred to the ring under control of counter OAC, which operates in synchronism with the transmitted −2MCT signal. Since any phase relationship may exist between the transmitted and received timing signals, contentions which may arise between read and write operations are resolved as follows: each exchange time slot (488ns) is divided into three time intervals, namely, one Buffer Read time interval and two Buffer Write time intervals. The Buffer Write time interval during which the buffer will actually be loaded is selected as a function of the phase relationship between the transmitted and received timing signals. In the embodiment shown in FIG. 6, each exchange time slot is divided for practical reasons into four equal time intervals called "quarter time intervals", namely, two Read time intervals, only one of which is actually used, and two Write time intervals designated WA and WB.

The operation of the device of FIG. 6 will now be described in detail with reference to the timing diagrams shown in FIG. 7. Buffer 173 is addressed only when its Select input is down, and operates in the Read mode or in the Write mode depending on whether its Read/Write input is up or down, respectively.

READ OPERATION

During the first quarter time interval, the −4MCT signal is up, thereby placing buffer 173 in the Read mode, but the QUAD and −2MCT signals are up, forcing the Select input of buffer 173 to an up level which inhibits the buffer. During the third quarter time interval, the −4MCT signal is up, thereby placing buffer 173 in the Read mode and enabling AND gate 182. The QUAD and −2MCT signals are down, forcing line 197 down. When the STG signal on line 189 goes down, buffer 173 is selected by a down level on line 187 and the storage locations addressed by the contents of counter OAC in modules 173LO and 173HI are read out and transferred to buses 171 and 175. The contents of these buses are loaded in output register 176 at the next positive-going transition of the −2MCT signal.

WRITE OPERATION

The selection of either of the second and fourth quarter time intervals for loading the buffer is made by first dividing each exchange time slot into first and second equal time intervals termed "wait times" that respectively include the second and fourth quarter time intervals and by then selecting the fourth or the second quarter time interval depending on whether the incoming exchange channels are loaded in input register 170 during the first or the second "wait" time. The loading of input register 170 is controlled by the positive-going transition of the 2MCR signal. The first and second "wait" times are determined by the WCG signal which is respectively down and up during the first and second "wait" times. If the WCG signal is up at the positive-going transition of the 2MCR signal, then Select flip-flop 192 is set to "1" and its "true" and "complement" outputs are respectively up and down. Gates 194, 195, 196 act as a single selector that transfers to line 197 the QUAD signal or the −2MCT signal depending on whether the Select flip-flop is set to "1" or to "0".

Figure 7:
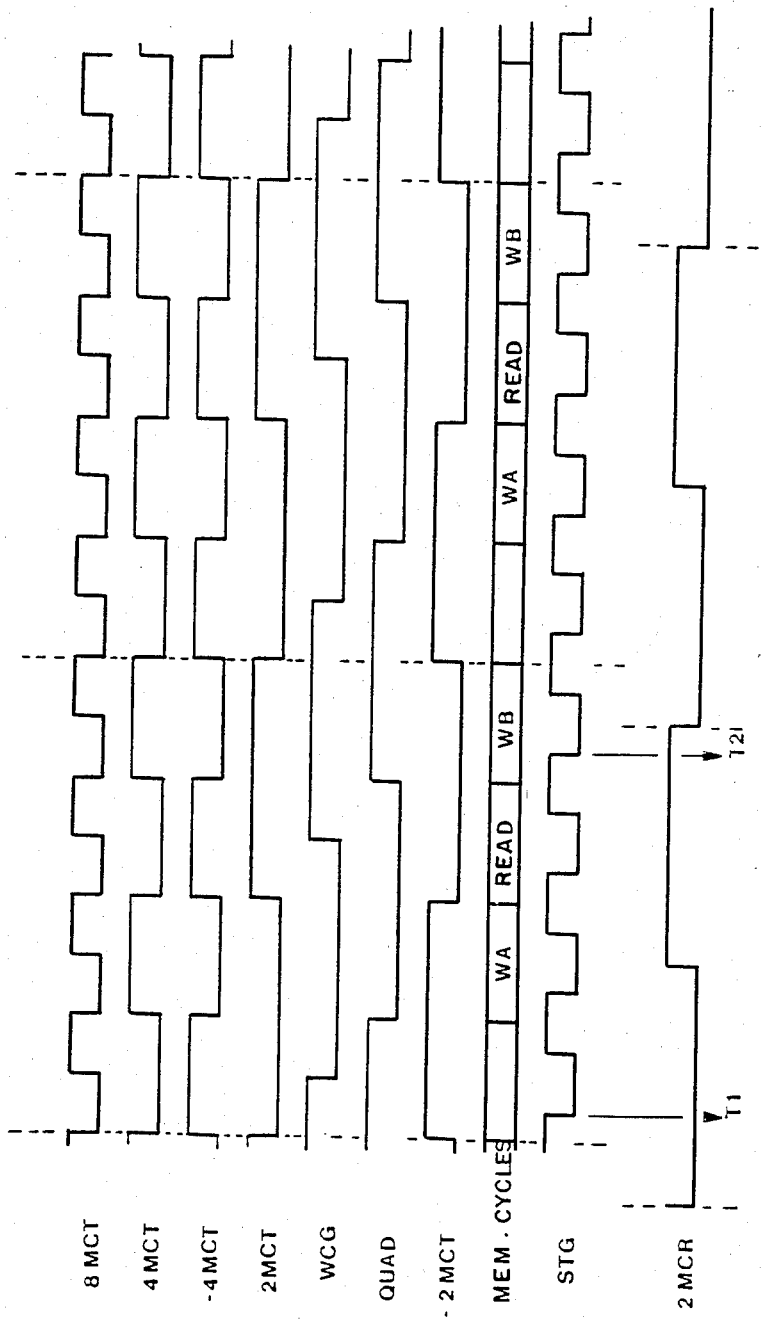

FIG. 7 illustrates the case where the transition of the 2MCR signal occurs while the WCG signal is down. The "true" and "complement" outputs of flip-flop 192 are respectively down and up and the −2MCT signal is applied to line 197. During the second quarter time, nothing happens since the −2MCT signal on line 197 inhibits the buffer. During the third quarter time, the −2MCT signal is down and the buffer operates in the Read mode as described above. During the fourth quarter time, the 4MCT signal is up, thereby enabling the address provided by counter IAC to be gated through AND gate 183 to the Address inputs of storage modules 173LO and 173HI, both of which are in the Write mode. When the STG signal goes down, the contents of buses 171 and 172 are written into modules 173LO and 173HI at the address indicated by counter IAC.

If the positive-going transition of the 2MCR signal occurs while WCG is up, the contents of the incoming exchange channels will be written in buffer 173 during the second quarter time interval following the occurrence of this transition. For example, referring to FIG. 7, if the positive-going transition of 2MCR occurs at T1, the buffer will be loaded during the second quarter time interval of the same exchange time slot. If the positive-going transition of 2MCR occurs at T2, then the buffer will be loaded during the second quarter time interval of the next exchange time slot.

Figure 8:
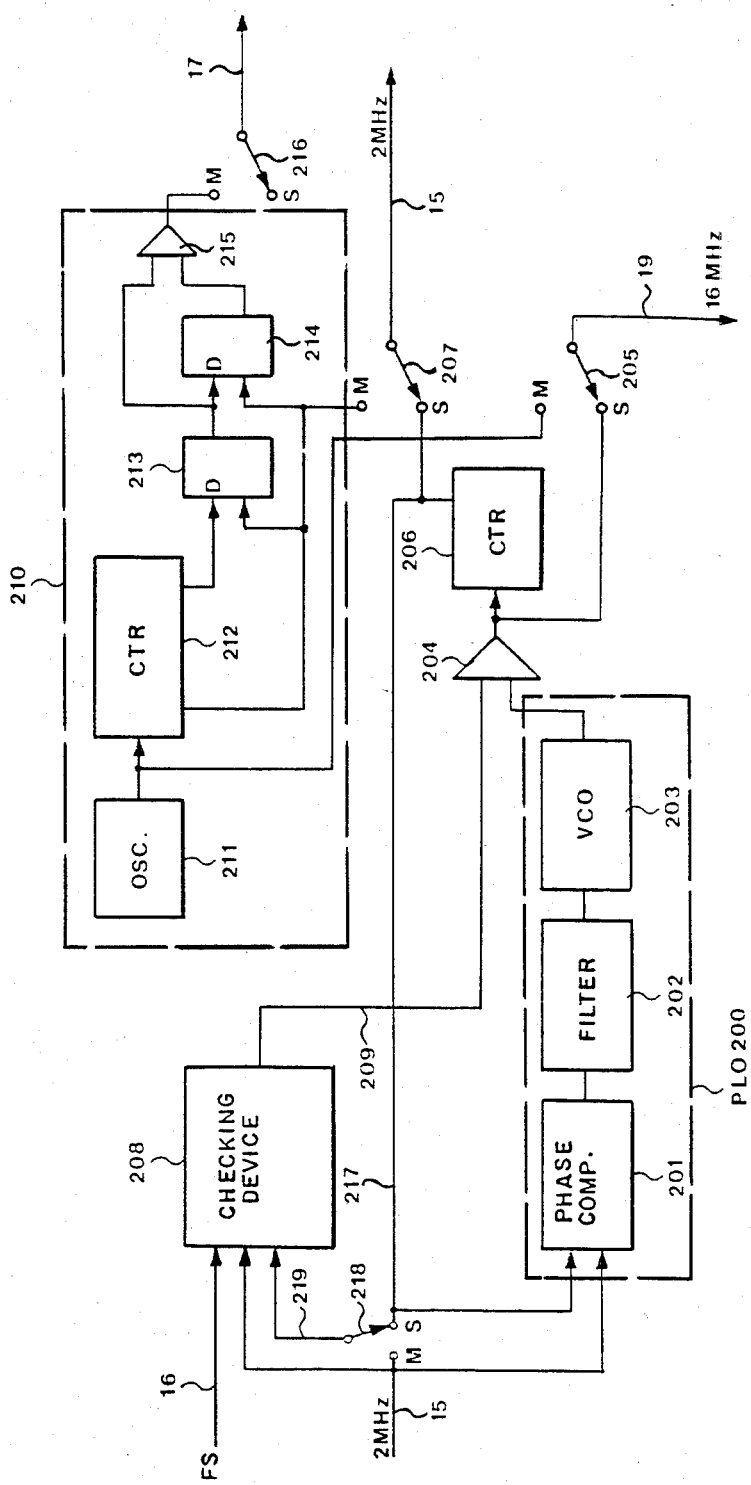

Referring now to FIG. 8, there is shown a block diagram of a timing device which illustrates embodiments of master timing device 13 and slave timing device 18. The 2.048 MHz timing signal present on the upstream portion of loop 15 is applied to a phase-locked oscillator (PLO) 200 conventionally comprised of a phase comparator 201, a loop filter 202 and a voltage controlled oscillator (VCO) 203 having a nominal frequency of 16.384 MHz. The output from VCO 203 is applied to an AND gate 204 whose output is connected to one of the terminals, designated S, of a two-terminal switch 205 whose common terminal is connected to line 19 (FIG. 1). The output from AND gate 204 is additionally applied to a 3-stage counter 206 whose output is connected via a line 217 to the other input of phase comparator 201 as well as to one of the terminals, designated S, of a two-terminal switch 207 whose common terminal is connected to the downstream portion of loop 15, and to one of the terminals, designated S, of a two-terminal switch 218. Lines 15 and 16 are connected to a timing signal checking device 208 to be described in detail with reference to FIG. 9, and which has its output connected via a line 209 to one input of AND gate 204. Line 15 is further connected to the other terminal, designated M, of switch 218 whose common terminal is connected to device 208 via a line 219. A timing signal source 210 is comprised of a master quartz oscillator 211 with a nominal frequency of 16.384 MHz and an 11-stage counter 212 controlled by the output from oscillator 211, which output is also connected to the other terminal, designated M, of switch 205. The third stage of counter 212 is connected to terminal M of switch 207 and to the clock input of two D-type flip-flops 213 and 214. The eleventh stage of counter 212 is connected to the D input of flip-flop 213 whose "true" output is connected to the D input of flip-flop 214. The "true" output from flip-flop 213 and the "complement" output from flip-flop 214 are applied to an AND gate 215 whose output is connected to one of the terminals, designated M, of a two-terminal switch 216. The other terminal, designated S, of switch 216 is not connected, and its common terminal is connected to line 17 (FIG. 1).

In any slave timing device 18, switches 205, 207, 216 and 218 are all set to position S and no timing signal source is provided. The 2.048 MHz timing signal on line 15 is applied to PLO 200 which produces a filtered 16.384 MHz timing signal in a known manner. In operation, line 209 is up and the signal generated by the PLO is applied to all components of the switching unit via line 19 (FIG. 1). There is obtained at the output of counter 206 a regenerated 2.048 MHz timing signal that is fed back to the input of PLO 200 in a known manner and is also sent over the downstream portion of timing signal line 15. Where no timing signal is present on the upstream portion of line 15 or the timing signal is such that it no longer can control PLO 200 correctly, or more generally where the timing signal is faulty, this condition is detected by device 208 which causes line 209 to go down, thereby inhibiting AND gate 204 and preventing the timing signal on the downstream portion of line 15 and the 16.384 MHz signal from being applied to the components of the switching unit. The signal on line 209 is also sent to controller 20. In a slave timing device, the timing signal checking device 208 also checks that the frame synchronizing signal on line 16 is synchronized with the regenerated timing signal applied to device 208 via line 217, switch 218 (set to position S) and line 219. If the two signals are not synchronized, then device 208 causes line 209 to go down.

In master timing device 13, switches 205, 207, 216, and 218 are all set to position M, and PLO 200 and counter 206 are not provided. The 16.384 MHz signal is supplied by master quartz oscillator 211. The 2.048 MHz timing signal applied to the downstream portion of line 15 is provided by counter 212, and the signal on the line connected to the eleventh stage of counter 212 is a 8 KHz signal with a 50% duty cycle. The 8 KHz signal is obtained at the "true" output of flip-flop 213 in synchronism with the 2.048 MHz signal. The output signal from flip-flop 213, inverted and delayed a time interval equal to the period of the 2.048 MHz signal, i.e. 488 ns, is obtained at the "complement" output of flip-flop 214. Thus, there is obtained at the output of AND gate 215 a train of 8 KHz pulses having a width of 488 ns each. This train of pulses is the frame synchronizing signal that is applied to ring control device 11 via line 17. The timing signal checking device 208 checks the timing signal present on the upstream portion of line 15 and the synchronization between the frame synchronizing signal on line 16 and the timing signal on line 15 as received by device 108 via switch 218 (set to position M) and line 219. Device 208 reports any abnormal condition to controller 20.

Figure 9:
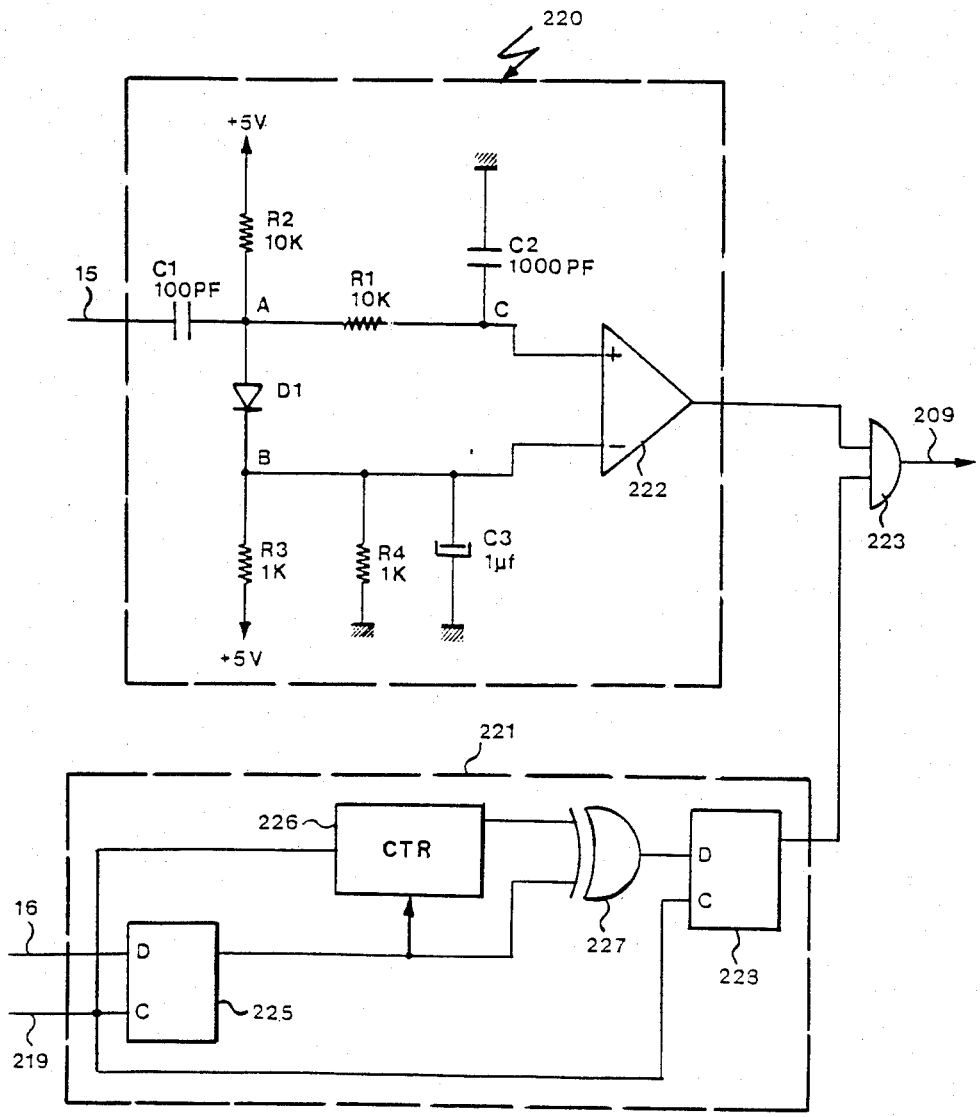

Referring now to FIG. 9, an exemplary embodiment of the timing signal checking device 208 is shown. Device 208 comprises a circuit 220 that senses the presence of the 2.048 MHz timing signal and a circuit 221 that checks the synchronization. In circuit 220, line 15 is connected to one side of a capacitor C1 which has its other side connected to the (+) input of a comparator 222 through a resistor R1. The node common to R1 and C1 (node A) is connected to a +5 volt supply through a resistor R2. Typically, resistors R1 and R2 have a value of 10 KΩ. Node A is also connected to the anode of a diode D1 which has its cathode connected to a +5 volt supply through a resistor R3 and to ground through a resistor R4. Typically, resistors R3 and R4 have a value of 1 KΩ. A high-capacitance (1 μF) capacitor C3 is connected in parallel to resistor R4. The node common to R3 and R4 (node B) is connected to the (−) input of comparator 222, which has its output connected to one input of an OR gate 223 whose output is connected to line 209 (FIG. 8).

In operation, node B is at a reference potential of 2.5 volts. When no timing signal is present on input line 15, capacitor C1 isolates line 15 from the remainder of circuit 220 and node A is at the same potential as node B plus the potential difference across diode D1, or approximately 3.2 volts. The output from comparator 222 is then at an up level, which indicates an error condition. When present on line 15, the timing signal is differenciated by capacitor C1 but in view of the low impedance of the circuit comprised of diode D1, resistors R3, R4 and capacitor C3 to positive signals, a signal mainly comprised of the succession of negative pulses that result from this differentiation is obtained at A. The latter signal, as integrated by the integrator comprised of R1, R2 and C2, that is, a negative voltage, is then obtained at C. The time constant of the integrator is chosen such that, whenever a correct timing signal is present on input line 15, the voltage at C is lower than the reference voltage at node B and a down level is obtained at the output of comparator 222. If the period of the timing signal on line 15 is excessive, then the potential at node C remains higher than the reference voltage at B and the output from comparator 222 goes high, thereby indicating an error condition.

Synchronization checking circuit 221 comprises a D-type flip-flop 221 whose D input receives via line 16 the frame synchronizing signal circulating on loop 12, and whose C input receives the 2.048 MHz signal via line 219. The "true" output of flip-flop 225 is applied to the reset input of an 8-stage counter 226, whose input receives the signal present on line 219. The "true" output from flip-flop 225 and the "carry" output from counter 226 are applied as inputs to an Exclusive OR gate 227 whose output is applied to the D input of a D-type flip-flop 228. The C input of flip-flop 228 is connected to line 219 and the output therefrom is applied to OR gate 223.

In operation, an 8 KHz signal synchronized with the timing signal present on line 219 is obtained at the "carry" output of counter 226. If this 8 KHz signal is synchronized with the frame synchronizing signal on line 16, then a low output signal denoting correct operation is produced by Exclusive OR gate 227. If such is not the case, then Exclusive OR gate 227 produces a high output signal denoting an error condition. The high output signal is transferred to line 209 through flip-flop 228 and OR gate 223.

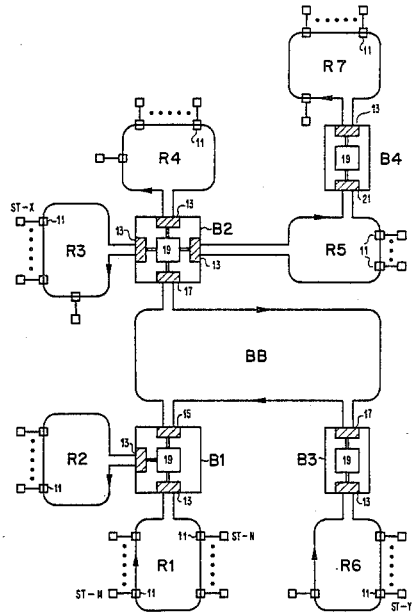

Having thus described our invention, what we claim as new, and desire to secure by Letters Patent is:

1. A synchronization system for a communication system wherein a plurality of units (SM-1, SM-N) are connected in series by means of a unidirectional closed-loop link (10) operating in the time-division multiplex mode with recurrent frames of equal duration each of which is divided into a plurality of equal time intervals during which said closed-loop link (10) carries a plurality of time-division channels, said synchronization system including loop control means (11) inserted in said closed-loop link (10) and being characterized in that it comprises:

a random access memory (173), input means (170) for applying the contents of the closed-loop link upstream of said loop control means (11) to the data input of said memory (173), output means (176) for applying the output data from said memory to said closed-loop means downstream of said loop control means, first counter means (IAC) for sequentially generating input addresses under control of an incoming timing signal (2MCR) and for supplying during each of said time intervals an input address specifying the location of said memory (173) where the output from said input means is to be stored, second counter means (OAC) for sequentially generating output addresses under control of an outgoing timing signal (−2MCT) and for supplying during each of said time intervals an output address specifying the location of said memory (173) that is to be read out, means (−4MCT, 182) for controlling read operations to be performed in said memory (173) during a fixed readout period (READ) within each of said time intervals, means (183, 186) for selectively controlling write operations to be performed in said memory (173) during either of two fixed write periods (WA and WB) within each of said time intervals dependent upon the delay of the incoming timing signal relative to the outgoing timing signal, a closed-loop timing link (15) closed by a master timing device (13) that sends said outgoing timing signal (2MCT) thereon and receives therefrom said incoming timing signal (2MCR), and a plurality of slave timing devices (18) inserted in said closed-loop timing link to regenerate the timing signal traveling thereon, with each of said slave timing devices deriving from the regenerated timing signal a timing signal that exhibits a higher frequency (16 MHz) than said regenerated timing signal and is applied to a group (SU-1, SU-M) comprising at least one unit.

2. A synchronization system according to claim 1, characterized in that each of the master and slave timing devices includes timing signal checking means (208) responsive to the application to the input of any of said devices of a defective timing signal traveling on said closed-loop timing link to terminate the generation of said regenerated timing signal.

3. A synchronization system according to claim 1, for a communication system wherein a frame synchronizing signal circulates on a synchronization link (12) parallel to said unidirectional closed-loop link (10), characterized in that said timing signal checking means includes:

a timing signal checking circuit (220) for determining whether the timing signal traveling on said closed-loop timing link and applied to the input of the timing device is defective, a synchronization checking circuit (221) for checking whether the regenerated timing signal and the frame synchronizing signal on said synchronization link are synchronized, and means for terminating the generation of the timing signal whenever either the timing signal on the timing link or the frame synchronizing signal on the synchronization link is defective.

4. A synchronization system for a communication system wherein a plurality of units (SM-1, SM-N) are connected in series by means of a unidirectional closed-loop link (10) operating in the time-division multiplex mode with recurrent frames of equal duration each of which is divided into a plurality of equal time intervals during which said closed-loop link (10) carries a plurality of time-division channels, said synchronization system including loop control means (11) inserted in said closed-loop link (10) and being characterized in that it comprises:

a random access memory (173), input means (170) for applying the contents of the closed-loop link upstream of said loop control means (11) to the data input of said memory (173), output means (176) for applying the output data from said memory to said closed-loop means downstream of said loop control means, first counter means (IAC) for sequentially generating input addresses under control of an incoming timing signal (2MCR) and for supplying during each of said time intervals an input address specifying the location of said memory (173) where the output from said input means is to be stored, second counter means (OAC) for sequentially generating output addresses under control of an outgoing timing signal (−2MCT) and for supplying during each of said time intervals an output address specifying the location of said memory (173) that is to be read out, means (−4MCT, 182) for controlling read operations to be performed in said memory (173) during a fixed readout period (READ) within each of said time intervals, means (191, WCG) for defining two write periods within each time interval, selection means (192) for selecting one of the two write periods depending on which of said two write periods contains the incoming timing signal, and means (185, 193–196) for controlling write operations performed in said memory (173) during the write period selected by said selection means.

* * * * *

United States Patent [19]

Bux et al.

[11] Patent Number: 4,539,679
[45] Date of Patent: Sep. 3, 1985

[54] SYNCHRONIZATION IN A COMMUNICATION NETWORK OF INTERCONNECTED RINGS

[75] Inventors: Werner K. Bux, Richterswil, Switzerland; Roy C. Dixon, Cary, N.C.; Ernst H. Rothauser, Reichenburg, Switzerland

[73] Assignee: International Business Machines Corp., Armonk, N.Y.

[21] Appl. No.: 554,646

[22] Filed: Nov. 23, 1983

[30] Foreign Application Priority Data

Nov. 26, 1982 [EP]  European Pat. Off. .......... 8211093.1

[51] Int. Cl.$^3$ ............................. H04J 3/02; H04J 3/00
[52] U.S. Cl. ........................................ 370/88; 370/86; 370/85; 370/89; 340/825.5
[58] Field of Search ............... 370/88, 86, 89, 94; 340/825.05, 825.5

[56] References Cited

U.S. PATENT DOCUMENTS

| | | | |
|---|---|---|---|
| 3,586,782 | 6/1971 | Thomas et al. | 370/88 |
| 3,731,002 | 5/1973 | Pierce | 370/88 |
| 4,287,592 | 9/1981 | Paulish et al. | 370/94 |
| 4,482,999 | 11/1984 | Janson et al. | 370/86 |

Primary Examiner—Douglas W. Olms
Assistant Examiner—Wellington Chin
Attorney, Agent, or Firm—John B. Frisone

[57] ABSTRACT

In a network of communication rings (R1 ... R7, BB) interconnected by bridges (B1 ... B4), access to each ring is regulated by a circulating token which is normally issued at irregular intervals depending on occurrence and length of messages. To enable communication of messages which have to be transmitted synchronously, i.e., at regular intervals, each ring has a synchronous bandwidth manager SBM which periodically issues a token for only synchronous information. Each SBM is located in a bridge node (13, 15) but only one of them which is located in a particular bridge node (15) is the master SBM from which all other SBM's are synchronized, using a synchronous token and/or special synchronization circuitry in each bridge. This allows a common period in the whole network for handling synchronous information, even if all rings have different bit rates.

8 Claims, 10 Drawing Figures